Figure 2:
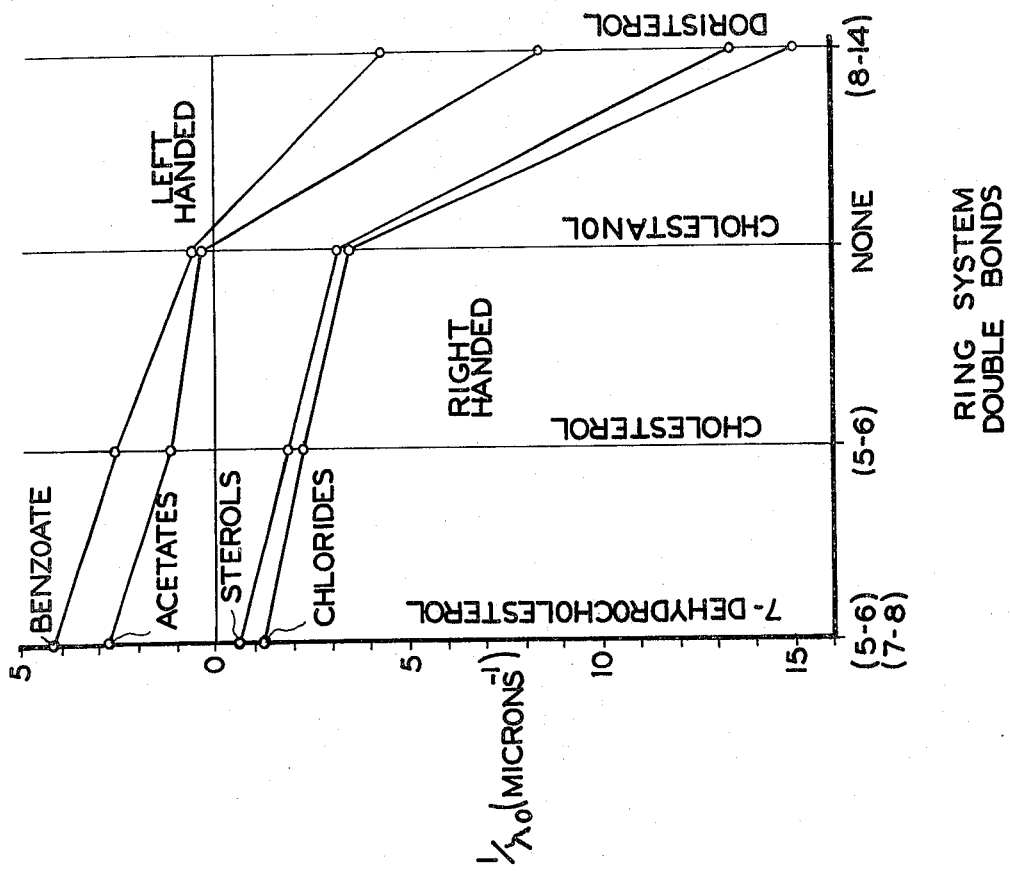

United States Patent
Leder

[11] 3,888,892
[45] June 10, 1975

[54] LIQUID CRYSTALLINE COMPOUNDS

[75] Inventor: Lewis B. Leder, Rochester, N.Y.

[73] Assignee: Xerox Corporation, Stamford, Conn.

[22] Filed: Oct. 24, 1972

[21] Appl. No.: 300,050

[52] U.S. Cl.................. 260/397.2; 350/160 LC
[51] Int. Cl................. C07c 169/58; C07c 169/60
[58] Field of Search .......................... 260/397.2

[56] References Cited
UNITED STATES PATENTS

| | | | |
|---|---|---|---|
| 2,854,452 | 9/1958 | Lauback | 260/239.55 |
| 3,409,404 | 11/1968 | Fergason | 23/230 |
| 3,580,865 | 5/1971 | Goldberg | 252/408 |
| 3,657,538 | 4/1972 | Fergason et al. | 250/83 |
| 3,697,297 | 10/1972 | Churchill | 106/131 |

OTHER PUBLICATIONS

Merck Index - 8th Ed. (1968), p. 410.

*Primary Examiner*—Henry A. French
*Attorney, Agent, or Firm*—James J. Ralabate; David C. Petre; Gaetano D. Maccarone

[57] ABSTRACT

Novel liquid crystalline compounds having a cholesteric mesophase are disclosed. The compounds have a relatively low cholesteric mesomorphic temperature range, are typically right-handed and have relatively small effective pitch. Methods of preparing the compounds and uses thereof are also described.

4 Claims, 2 Drawing Figures

LIQUID CRYSTALLINE COMPOUNDS

BACKGROUND OF THE INVENTION

This invention relates generally to liquid crystalline compounds and more specifically to liquid crystalline compounds having a cholesteric mesophase. Additionally the invention relates to uses of the novel compounds.

Recently there has been substantial interest in the discovery of more useful applications for the class of substances known as "liquid crystals." The name liquid crystals has become generic to liquid crystalline materials which exhibit dual physical characteristics, some of which are typically associated with liquids and others which are typically unique to solids. Liquid crystals exhibit mechanical characteristics, such as viscosities, which are ordinarily associated with liquids. The optical scattering and transmission characteristics of liquid crystals are similar to those characteristics ordinarily unique to solids. In liquids or fluids, the molecules are typically randomly distributed and oriented throughout the mass of the substance. Conversely, in crystalline solids the molecules are generally rigidly oriented and arranged in a specific crystalline structure. Liquid crystals resemble solid crystals in that the molecules of the liquid crystalline substances are regularly oriented in a fashion analogous to but less extensive than the molecular orientation and structure in a crystalline solid. Many substances have been found to exhibit liquid crystalline characteristics in a relatively narrow temperature range; but below such temperature ranges the substances typically appear as crystalline solids and above such temperature ranges they typically appear as isotropic liquids.

Liquid crystals are known to appear in three different forms: the smectic, nematic and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules are arranged in a manner which is unique to each of the three mesomorphic structures. Each of these three structures is well known in the liquid crystal art.

Some liquid crystalline substances possess optically negative characteristics. Birefringence, also referred to as double refraction, is an optical phenomenon characteristic of some solid crystals and most liquid crystal substances. When a beam of unpolarized light strikes a birefringent substance it is split into two polarized components whose transverse vibrations are at right angles to each other. The two components are transmitted at different velocities through the substance and emerge as beams of polarized light. By the term "liquid crystalline substances which have optically negative characteristics," as used herein, is meant those for which the extraordinary index of refraction $\eta_E$ is smaller than the ordinary index of refraction $\eta_o$. Cholesteric liquid crystal substances exhibit this property. For a detailed description of this phenomenon see Optical Crystallography, Wahlstrom, 4th Edition, Wiley and Sons, Inc., New York.

The molecules in cholesteric liquid crystals are arranged in very thin layers with the long axes of the molecules parallel to each other and to the plane of the layers within each layer. Because of the structural asymmetry and steric nature of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in "Molecular Structure and the Properties of Liquid Crystals," G. W. Gray, Academic Press 1962.

Cholesteric liquid crystals have the property that when the propagation direction of plane polarized or unpolarized light is along the helical axis thereof, i.e., when the light enters in a direction perpendicular to the long axes of the molecules, (neglecting absorption considerations), this light is essentially unaffected in transmission through thin films of such liquid crystals except for a wavelength band centered about some wavelength $\lambda_o$ where $\lambda_o = 2np$ with n representing the index of refraction of the liquid crystal substance and p the pitch or repetition distance of the helical structure. The bandwidth of this wavelength band centered about $\lambda_o$ will typically be of the order of about $\lambda_o/14$. For light of a wavelength $\lambda_o$, the cholesteric liquid crystal, under these conditions, exhibits selective reflection of the light such that approximately 50 percent of the light is reflected and approximately 50 percent is transmitted, assuming negligible absorption which is usually the case, with both the reflected and transmitted beams being approximately circularly polarized in opposite directions, respectively.

For light having wavelengths around $\lambda_o$ but not at $\lambda_o$ the same effect is present but not as pronounced. The transmitted light is not circularly polarized but is instead elliptically polarized. The cholesteric liquid crystals which exhibit this property of selective reflection of light in a region centered around some wavelength $\lambda_o$ are said to be in the Grandjean or "disturbed" texture. If $\lambda_o$ is in the visible region of the spectrum the liquid crystalline film appears to have the color corresponding to $\lambda_o$ and if $\lambda_o$ is outside the visible spectral region the film appears colorless.

Depending upon the intrinsic screw sense of the helix, i.e., whether it is right-handed or left-handed, the light that is transmitted in the region about $\lambda_o$ is either right-hand circularly polarized light (RHCPL) or left-hand circularly polarized light (LHCPL). The transmitted light is circularly polarized with the same sense as that intrinsic to the helix. Thus, a cholesteric liquid crystal having an intrinsic helical structure which is left-handed in sense will transmit LHCPL and one having a helical structure which is right-handed in sense will transmit RHCPL.

Hereinafter these cholesteric liquid crystal substances will be identified in order to conform with popular convention, by the kind of light which is reflected at $\lambda$hd o. When a film is said to be right-handed, it is meant that it reflects RHCPL, and when a film is said to be left-handed, it is meant that it reflects LHCPL.

A right-handed cholesteric liquid crystal substance transmits LHCPL essentially completely at $\lambda_o$ whereas the same substance reflects almost completely RHCPL. Conversely a left-handed film is almost transparent to RHCPL at $\lambda_o$ and reflects LHCPL. Since plane polarized or unpolarized light contain equal amounts of RHCPL and LHCPL, a cholesteric liquid crystal film is approximately 50 percent transmitting at $\lambda_o$ for these sources when the liquid crystal is in its Grandjean texture.

A further unique optical property of optically negative liquid crystal films is that contrary to the normal situation when light is reflected, such as by a mirror, where the sense of the circular polarization of the reflected light is reversed, this same phenomenon does not occur with light reflected by these liquid crystal films. The sense of the circular polarization of light reflected from these liquid crystal substances is not reversed but rather remains the same as it was before it came into contact with the liquid crystal substance. For example, if RHCPL having a wavelength $\lambda_o$ is directed at a right-hand film having $\lambda_o = 2np$ it is substantially completely reflected and, after reflection, remains RHCPL. If the same light were to be directed on a mirror the reflected light would be LHCPL.

Because of these optical properties, optically negative liquid crystalline substances have been found to be highly advantageous for use in a number of varying applications. U.S. Pat. Nos. 3,669,525 and 3,679,290 disclose the use of such liquid crystalline materials in optical filter systems. The materials may be advantageously utilized in imaging methods such as are disclosed in U.S. Pat. Nos. 3,642,348 and 3,652,148. The thermal properties of these materials make them advantageous for use in thermometers, in detecting flaws in structural members and in medical applications. Of course many other uses could be described but these should be sufficient to indicate the varied and important applications of optically negative liquid crystals.

In many of the applications cited above it would be desirable to have a liquid crystalline material which exists in the cholesteric mesophase at some temperature around room temperature (about 23°C); although there are also applications where it is to be desired to have the liquid crystalline material in this optically active state above room temperature or below room temperature. To achieve a material having a particular desired operational cholesteric mesomorphic temperature as well as other desired properties, e.g., a particular pitch or electric field sensitivity, it has heretofore been the usual practice to form compositions which are made up entirely of cholesteric liquid crystals or combinations of cholesterics and nematic liquid crystals or combinations of cholesterics and smectic liquid crystals.

Furthermore it has been found that considerable versatility can be achieved with respect to cholesteric liquid crystals by mixing together combinations of right-handed and left-handed cholesteric liquid crystals. In such a mixture there is a composition at which the right-handed and left-handed components nullify each other to provide an infinite pitch. This technique also makes it possible to generally achieve a broader range of pitches than typically can be achieved by mixing together only right-handed or only left-handed materials. See Proc. ACS Symposium on Ordered Fluids and Liquid Crystals, Sept. 1969, p. 463.

Many left-handed cholesteric liquid crystalline materials are known; however to date only relatively few right-handed materials have been provided. Moreover a difficulty with respect to potential uses of cholesteric liquid crystalline materials in electro-optic devices has been the relatively high temperatures at which the majority of the known cholesteric materials become mesomorphic. Typically, electro-optic devices are operated at or near room temperature. Thus devices utilizing cholesteric liquid crystals having relatively high mesomorphic temperature ranges would require additional apparatus to maintain the temperature of the liquid crystalline materials within their mesomorphic range thereby undesirably complicating the overall device configuration. Therefore there exists a continuing need for cholesteric liquid crystalline materials which have mesomorphic temperature ranges at or near room temperature and particularly so for such materials which are right-handed.

SUMMARY OF THE INVENTION

It is therefore an object of this invention to provide novel liquid crystalline materials which have a cholesteric mesophase and possess the above-described desirable features.

It is another object to provide liquid crystalline materials having a cholesteric mesophase at or near room temperature.

It is a further object to provide liquid crystalline materials which have a relatively small effective pitch.

A further object is to provide liquid crystalline materials which have a right-handed cholesteric mesophase.

It is still another object to provide methods for preparing such novel liquid crystalline materials.

Yet another object is to provide liquid crystalline materials which are useful in electro-optical applications.

A still further object of the invention is to provide such liquid crystalline materials which may be utilized in electro-optic imaging and display devices.

The foregoing and other objects and advantages are accomplished in accordance with the invention by providing novel liquid crystalline compounds which are represented by the general formula

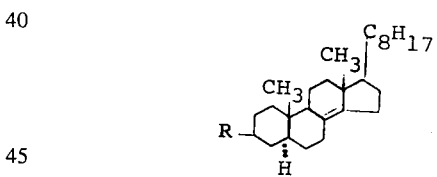

where R is a radical which may be a carbonate, ester, ether, thiocarbonate, thioester, thioether, xanthate or halide.

The novel compounds of the invention are typically right-handed cholesteric liquid crystalline materials, have a relatively small effective pitch and are advantageous for use in many applications including various electro-optic imaging techniques which will be described in detail further below.

Figure 1:
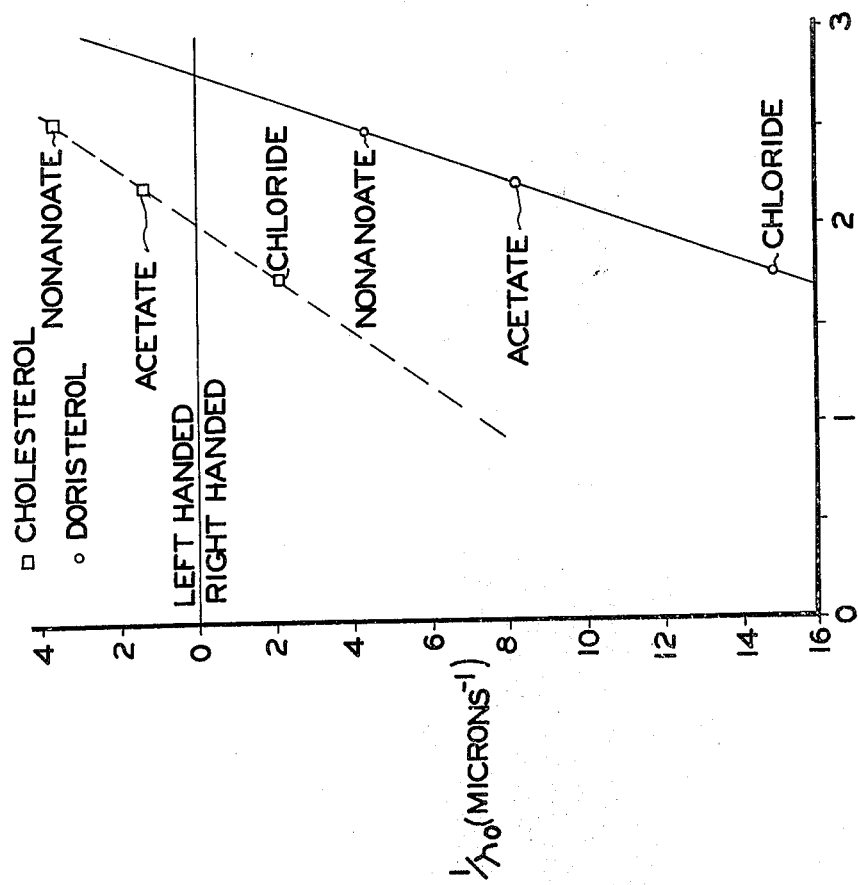

The invention will be more fully understood from the following detailed description of various embodiments thereof particularly when read in conjunction with the accompanying drawings wherein:

FIG. 1 is a plot of $1/\lambda_o$ vs the $3\beta$ addition for various cholesteryl and doristeryl derivatives; and FIG. 2 is a plot of $1/\lambda_o$ for various cholesteric liquid crystalline materials.

The novel compounds of the invention are derivatives of a steroid compound having the formula

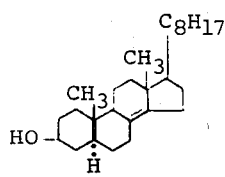

which will, for simplicity, be referred to hereinafter as "doristerol" although it should be recognized that this steroid has been identified in various instances in the art as Δ8(14)-cholestanol or cholest-8(14)-en-3β-ol. Hereinafter the compounds of the invention will be referred to as "doristeryl" compounds.

It will be apparent that doristerol is structurally similar to cholesterol which is represented by the formula

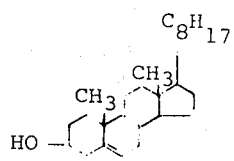

with the exception that doristerol has a double bond in the 8–14 carbon position of the ring system whereas cholesterol has a double bond in the 5–6 carbon position. Of course, it is well known in the art that cholesterol does not exhibit a liquid crystalline mesophase.

Doristerol can conveniently be prepared by the catalytic hydrogenation of 7-dehydrocholesterol which is represented by the structural formula

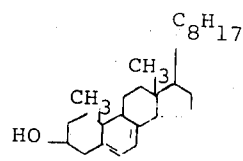

A detailed description of the preparation of doristerol will be provided below herein.

The doristeryl derivatives which are the novel compounds of the invention can be synthesized by various techniques. According to one method the 7-dehydrocholesteryl compound is formed by reacting 7-dehydrocholesterol with the appropriate alkyl chloroformate to form carbonates or with the appropriate alkyl acid anhydride to form esters. These are subsequently hydrogenated with an appropriate catalyst to provide the desired doristeryl compound. Another technique comprises hydrogenating 7-dehydrocholesterol to form doristerol and then reacting the doristerol with appropriate compounds such as, for example, alkyl chloroformates to form doristeryl carbonates or alkyl acid anhydrides to form doristeryl esters. This latter technique is preferred since it has been found through experimentation that higher yields are typically obtained.

Of course other methods for forming the advantageous compounds of the invention will be apparent to those skilled in the art. For example, the doristeryl carbonates can be made by first preparing the doristeryl or 7-dehydrocholesteryl chloroformate and then reacting either of these compounds with the appropriate alkyl alcohol. In preparing the esters of doristerol, where the alkyl acid anhydride is not easily available, the doristeryl ester can be made in the manner described by Elser, Pohlmann and Boyd, Molec. Crystals and Liquid Crystals, 11, 279 (1970) for the preparation of cholesteryl alkanethioates by reacting doristerol with the imidazolide of the alkanoic acid.

There are known reaction sequences which can be employed to substitute S for O in esters, carbonates and ethers of doristerol. For example the —OH attached to the ring system in doristerol can be converted to —SH. This latter compound can be converted to a thiocarbonate by the same reaction sequences employed to make carbonates of doristerol. Reactions of the O anion of doristerol with carbon disulfide followed by alkylation with an alkyl halide will provide the xanthate

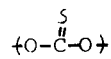

derivatives of doristerol.

The novel compounds of the invention typically have relatively low mesomorphic temperature ranges and, further, these are typically significantly lower than those of the corresponding cholesteryl compounds. In Table I there are shown the critical temperatures for the chloride and some esters and carbonates of doristerol. All of these materials are cholesteric; the chloride, butyrate, pentanoate, hexanoate and heptanoate are monotropic while the others are enantiotropic.

All of the doristeryl and cholesteryl compounds listed in Table I which are not referenced were measured by differential scanning calorimetry (DSC) or by the capillary method wherein the material is placed in a capillary tube which is immersed in an oil, the oil heated and melting observed with a magnifying glass and the temperature taken from a thermometer immersed in the oil. For a more detailed description of the latter technique see Molecular Structure and the Properties of Liquid Crystals, G. W. Gray, Academic Press (1962) pages 6, 57.

TABLE I

| COMPOUND | DORISTERYL | | CHOLESTERYL | |
|---|---|---|---|---|
| | Tch (°C) | Ti (°C) | Tch (°C) | Ti (°C) |
| CHLORIDE | (36.8) | 51 | (64) | 96 |
| PROPIONATE | 80.5 | 83.5 | 98 | 114 |
| BUTYRATE | (76) | 81 | 102 | 112.5 |
| PENTANOATE | (67) | 83 | 92.6[a] | 101.5[a] |
| HEXANOATE | (68) | 85 | (99.5) | 101.5 |
| HEPTANOATE | (55.5) | 65 | (92.7)[a] | 113[a] |
| OCTANOATE | 48.5 | 69 | (94.7)[a] | 110.5[a] |
| NONANOATE | 45 | 69 | 78 | 92 |
| DECANOATE | 58.7 | 71.2 | 85.5[c] | 92.5[c] |
| DODECANOATE | 66.5 | 70.2 | (90.0)[c] | 93.0[c] |
| TRIDECANOATE | 67.8 | 68.9 | 78.8[d] | 84.8[d] |
| TETRADECANOATE | 66.6 | 68.4 | 81.0[c] | 86.5[c] |
| HEXYL CARBONATE | 53 | 62 | (90)[b] | 108[b] |
| HEPTYL CARBONATE | 41.5 | 62 | 79[b] | 85[b] |
| OCTYL CARBONATE | 31 | 48 | 53[b] | 83[b] |

[a]R.D. Ennulat, Molec. Cryst. & Liquid Cryst. 8, 247 (1969)
[b]W. Elser, Molec. Cryst. 2, 1 (1966)
[c]G. W. Gray, J. Chem. Soc., 3733 (1956)
[d]R. D. Ennulat, Molec. Cryst., 3, 405 (1968)

As previously mentioned, the novel compounds of the invention typically have a relatively small effective pitch. In Table II there are shown the λ₀ (pitch) values for some of the compounds.

TABLE II

| Doristeryl Compound | $\lambda_o(\mu)$ |
| --- | --- |
| PROPIONATE | 0.133 |
| BUTYRATE | 0.141 |
| PENTANOATE | 0.153 |
| HEXANOATE | 0.158 |
| HEPTANOATE | 0.175 |
| OCTANOATE | 0.200 |
| NONANOATE | 0.230 |
| HEXYL CARBONATE | 0.143 |
| HEPTYL CARBONATE | 0.143 |
| OCTYL CARBONATE | 0.159 |

The pitch values were determined by making mixtures of varying proportions of each compound with cholesteryl oleyl carbonate. The critical wavelength, $\lambda_o$, for each composition was measured with a Cary 14 Spectrophotometer. The incident light was unpolarized and normal to the sample plane and transmission spectra were recorded. A plot of $1/\lambda_o$ vs. wt. percent of doristeryl compound was then extrapolated to 100 percent to obtain the effective pitch and rotatory sense. A detailed description of this method can be found in Chem. Phys. Letters, J. E. Adams and L. B. Leder, 6, 90 (1970); and J. Chem. Phys., L. B. Leder, 54, 4671 (1971).

As stated above, the novel liquid crystalline compounds are typically right-handed materials. Following is a proposed theoretical explanation for this typical property of the doristeryl derivatives to better aid those skilled in the art to understand the invention. It should be recognized of course that the invention is not intended to be limited by these theoretical considerations. Nevertheless observed experimental results are consistent with the proposed theory. Applicant has previously shown that structural changes in the 17 side chain of cholesterol as well as the effective length of the 3β addition can determine the magnitude of pitch for a cholesteric liquid crystalline material. See J. Chem Phys. 54, 4671 (1971) and J. Chem. Phys. 155, 2649 (1971). In the former article it was disclosed that the cholesterol "skeleton" is basically right-handed and that additions at the 3β position have a tendency to decrease the right-handedness (or increase the pitch) until at some critical length of the 3β additive, in that case about 2.08A, the cholesteryl compounds become left-handed. In the same manner it has been shown that the doristeryl "skeleton" is also right-handed but more so than the cholesterol "skeleton" and that additions at the 3β position also have the tendency to decrease the right-handedness up to some critical length. In the case of the doristeryl compounds the critical length is about 2.81A. For a graphical illustration of the foregoing see FIG. 1.

Now it is theorized that a third factor which operates to determine the handedness, or chiral sense, of a steroidal cholesteric liquid crystalline compound is the position (or positions) of the double bond(s) in the steroid ring system. The doristeryl compounds have a double bond in the 8–14 carbon position and it appears that this double bond position is particularly effective in orienting the ring system in such a direction as to make the resultant compounds typically strongly right-handed.

This phenomenon is graphically illustrated in FIG. 2. Referring now to FIG. 2 there is seen a plot of $1/\lambda_o$ for the sterols and the steryl chlorides, acetates, and benzoates for several double bond configurations. The horizontal axis is arranged in the order of increasing right-handedness of the sterol skeleton as one goes from left to right on the figure. The cholestanol skeleton, which is represented by the formula

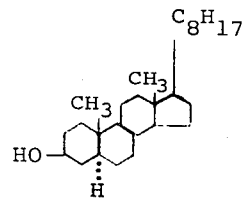

is chosen as a reference point since it does not have any double bond in the ring system. It can be readily seen that the addition of the 5–6 double bond in cholesterol tends to reduce the right-handedness of the compounds whereas the addition of the double bond in the 8–14 position for doristerol tends to increase it. For example, $1/\lambda_o$ for cholesteryl chloride is approximately 2/3 that for cholestanyl chloride while for doristeryl chloride is approximately 4.3 times that for cholestanyl chloride. When a second double bond is added at the 7–8 carbon position thus forming 7-dehydrocholesterol a further decrease in $1/\lambda_o$ occurs so that this value for the chloride of 7-dehydrocholesterol is about one-third that for cholestanyl chloride and approximately one-half that for cholesteryl chloride.

The novel compounds of the invention can be advantageously utilized in any method, device, etc. wherein cholesteric liquid crystalline materials are used. Typical applications in which the compounds may be used include, for example: optical filters such as are disclosed in U.S. Pat. Nos. 3,669,525 and 3,679,290 and copending application Ser. No. 121,378, filed Mar. 5, 1971 now U.S. Pat. No. 3,711,181; electro-optic applications such as, for example, the imaging techniques disclosed in U.S. Pat. Nos. 3,642,348 and 3,652,148; displays, detection devices such as thermal, pressure vapor sensitive devices and many others.

The invention will now be further described in detail with respect to specific preferred embodiments thereof by way of Examples, it being understood that these are intended to be illustrative only and the invention is not limited to the materials, percentages, conditions, etc., which are recited therein. All parts and percentages recited are by weight unless otherwise specified. IR spectra confirm the presence of the compound expected from the reaction described in each example.

EXAMPLES

All of the doristerol compound used in the examples is made by the following procedure: 7-dehydrocholesterol (available commercially from Aldrich Chemical Co.) is purified by recrystallization from acetone by first dissolving a quantity of the compound in hot acetone and then allowing the acetone to cool slowly so that the dissolved 7-dehydrocholesterol comes out of solution in pure form. The 7-dehydrocholesterol is then hydrogenated. For hydrogenation about 2 grams of 7-dehydrocholesterol is dissolved in a mixture of 285 ml ethyl acetate and 15 ml acetic acid to which is added about 0.25 gm. of 10 percent palladium on carbon catalyst. This reaction mixture, contained in a suitable glass vessel, is pressurized with several atmospheres of hydrogen (about 50 lbs.) and shaken in an appropriate apparatus for about 19 hours.

After the hydrogenation process is completed the palladium on carbon catalyst is filtered off from the solution. The liquid portions are removed by standard procedures and the solid doristerol is purified by recrystallization from methyl alcohol or other suitable solvent. For highest purity column chromatography techniques may be used.

Of course, it will be understood that the proportions shown above are typical and they may be varied within some limits. For example, the amount of catalyst or acetic acid may be increased or the reaction time shortened. The amount of ethyl acetate used is generally governed by the amount of 7-dehydrocholesterol used because of solubility factors. Chloroform may be employed as a solvent rather than ethyl acetate. The chloroform has the advantage of being able to dissolve more 7-dehydrocholesterol and thus more of the latter can be hydrogenated in a given reaction.

EXAMPLE I

About 2.5 grams of doristerol and about 1.07 grams of hexyl chloroformate are dissolved in about 50 ml of dry benzene in a three-necked flask which is equipped with a dropping funnel and a condensation column. In the dropping funnel is placed a solution of about 1 ml of dry pyridine in about 20 ml of dry benzene. Dry nitrogen is passed through the flask while the reaction mixture is stirred and the dry pyridine-benzene solution is allowed to slowly drop into the reaction mixture. After the pyridine-benzene solution is added, the entire reaction mixture is heated to reflux with stirring and refluxing continued until the reaction is completed (about 4 hours).

The solution is then cooled to room temperature and the solid doristeryl hexyl carbonate recovered by filtration and flash evaporation. The compound is redissolved in anhydrous ether, washed with both acid and basic water solutions, dried, flash evaporated and finally purified by recrystallization from methyl alcohol.

It will be understood that proportions other than those listed may be used in this procedure except that the alkyl chloroformate should be at least equimolar with the steryl alcohol.

EXAMPLE II

Doristeryl heptyl carbonate is made by the procedure described in Example I with the exception that about 3 grams of doristerol and about 1.39 grams of heptyl chloroformate are initially dissolved in 30 ml of dry benzene.

EXAMPLE III

About 5 grams of 7-dehydrocholesterol and about 2.13 grams of hexyl chloroformate are dissolved in about 187 ml of dry benzene in a three-necked flask which is equipped with a dropping funnel and a condensation column. In the dropping funnel is placed a solution of about 1 ml of dry pyridine in about 20 ml of dry benzene. Dry nitrogen is passed through the flask while the reaction mixture is stirred and the dry pyridine-benzene solution is allowed to slowly drop into the reaction mixture. After the pyridine-benzene solution is added, the entire reaction mixture is heated to reflux with stirring and refluxing continued until the reaction is completed (about 4 hours). The 7-dehydrocholesteryl hexyl carbonate formed in this manner is recovered by the same techniques described in Example I.

About 0.75 gram of 7-dehydrocholesteryl hexyl carbonate is dissolved in a mixture of 255 ml ethyl acetate and 15 ml acetic acid to which is added about 0.25 gram of 10 percent palladium on carbon catalyst. This reaction mixture, contained in a suitable glass vessel, is pressurized with several atmospheres of hydrogen (about 50 lbs.) and shaken in an appropriate apparatus until hydrogenation is complete. The doristeryl hexyl carbonate is recovered and purified by the same techniques described in Example I.

EXAMPLE IV

Doristeryl heptyl carbonate is made by the same procedure described in Example III. 7-dehydrocholesteryl heptyl carbonate is made using about 10 grams of 7-dehydrocholesterol and about 4.7 grams of heptyl chloroformate dissolved in about 400 ml benzene to which was added 4 ml of pyridine.

About 0.51 gram of 7-dehydrocholesteryl heptyl carbonate is dissolved in a mixture of 40 ml ethyl acetate and 6 ml acetic acid to which is added about 0.2 gram of 10 percent palladium on carbon catalyst. Doristeryl heptyl carbonate is formed as a result of hydrogenation.

EXAMPLE V

Doristeryl octyl carbonate is made by the same procedure described in Example III. 7-dehydrocholesteryl octyl carbonate is made using about .5 grams of 7-dehydrocholesterol and about 2.5 grams of octyl chloroformate dissolved in about 150 ml of benzene.

About 0.6 gram of 7-dehydrocholesteryl octyl carbonate is dissolved in a mixture of about 50 ml ethyl acetate and 10 ml acetic acid to which about 0.3 gram of catalyst is added. Doristeryl octyl carbonate is formed by the hydrogenation reaction.

EXAMPLE VI

About 1.9 grams of doristerol, 100 ml of propionic anhydride and 20 ml of dry pyridine are heated together in a flask through which dry nitrogen is flowed. After about three hours the liquors are poured over ice and the doristeryl propionate reaction product precipitated out on the ice. The precipitate is filtered from the liquids, redissolved in anhydrous ether and recovered and purified by the same techniques described above in Example I.

EXAMPLE VII

Doristeryl butyrate is made by the same procedure described in Example VI with the exception that about 2.75 grams of butyric anhydride is used.

EXAMPLE VIII

Doristeryl pentanoate is made by the same procedure described in Example VI using about 2.2 grams of doristerol and about 3.75 grams of pentanoic anhydride.

EXAMPLE IX

Doristeryl hexanoate is made by the same procedure described in Example VI using about 2.3 grams of doristerol and about 4.5 grams of hexanoic anhydride.

EXAMPLE X

A solution of about 0.67 gram of heptanoic acid in about 5 ml of benzene is added to a stirred slurry of about 0.81 gram of 1,1'-carbonyldiimidazole in about 13 ml of benzene in a flask. The mixture is stirred in a nitrogen atmosphere until $CO_2$ evolution ceases (about 20 minutes). About 1.94 grams of doristerol are then added and the entire mixture refluxed for about 6 hours. The doristeryl heptanoate formed by this reaction procedure is recovered by the same techniques described in Example I.

EXAMPLE XI

Doristeryl octanoate is made by the procedure described in Example X using about 0.72 gram of octanoic acid.

EXAMPLE XII

About 3.0 grams of doristerol and about 1.85 grams of nonanoyl chloride in 42 ml of pyridine are placed in a flask, heated in a nitrogen atmosphere with stirring at about 100°C for about 4 hours. The solution is then allowed to cool and stirring is continued for about 12 hours. The doristeryl nonanoate formed by this reaction is recovered and purified by the same techniques described in Example I. Doristeryl nonanoate ($C_{36}H_{62}O_2$) requires 82.07% C; 11.86% H; 6.07% O. The elemental analysis for the compound prepared is 82.28% C; 12.00% H; 5.72% O.

EXAMPLE XIII

About 15 grams of cholesteryl chloride are dissolved in about 75 ml of petroleum ether (B.P. 60°–110°C). About 7.5 grams of N-bromosuccimide and a few milligrams of benzoyl peroxide are added to the solution. The mixture is refluxed for about 1½ hours after which it was flash evaporated. About 27.75 grams of diethylaniline is then added and the mixture heated for about 3 hours at 95°C. The solution is then cooled and about 75 ml of petroleum ether added. The precipitated diethylaniline hydrobromide is filtered off and the filtrate washed with dilute HCL and sodium carbonate solutions. The ether extracts are dried over anhydrous sodium sulfate.

The ether is evaporated and the residue (a liquid) is dissolved in about 15 ml of acetone and allowed to stand. The crystals of 7-dehydrocholesteryl chloride which form are filtered off and then recrystallized from acetone and decolorising charcoal. To further purify the material, the crystals are refluxed in pyridine for about 2 hours and the solution then allowed to cool. Water is added slowly to induce crystallization. The resulting crystals are filtered off and recrystallized from acetone.

About 1 gram of 7-dehydrocholesteryl chloride is dissolved in about 120 ml of a 5:1 mixture of ethyl acetate: acetic acid and to this is added about 0.3 gram of a 10 percent palladium on charcoal catalyst. This mixture is hydrogenated for about 24 hours. The crude doristeryl chloride is recovered by filtration and subsequently purified by the same techniques described above.

EXAMPLES XIV-XVII

The synthesis of the esters in these examples is carried out via the transacylation reaction of imidazolide as described in Angew. Chem., H. A. Staab, 71, 194 (1959). All the experiments are carried out under nitrogen.

EXAMPLE XIV

A solution of 1.03 grams of decanoic acid in 20 ml of dry benzene is added to a mixture of 0.97 gram of 1,1'-carbonyldiimidazole (available commercially from Aldrich Chem. Co., Inc., Milwaukee, Wisconsin) in 30 ml of dry benzene with stirring. When the evolution of $CO_2$ has ceased, 1.92 grams of doristerol are added. The reaction mixture is refluxed for about 4–5 hours and benzene is distilled off. The residue is mixed with 100 ml of dry hexane, the precipitated imidazole is removed by filtration and the filtrate chromatographed on a 20 × 450 mm column of silica gel (Baker analyzed reagent, 60–200 mesh).

Elution with a 2:8 mixture of benzene and hexane provided 2.23 grams of chromatographically purified doristeryl decanoate. Recrystallization from acetone gave fine crystals. Doristeryl decanoate ($C_{37}H_{64}O_2$) requires 82.16% C; 11.93% H; 5.91% O. The elemental analysis for the compound prepared is 82.10% C; 12.06% H; 5.84% O.

EXAMPLE XV

The procedure described in Example XIV is repeated with the exception that 1.20 grams of dodecanoic acid are used in place of the decanoic acid. 2.33 grams of chromatographically purified doristeryl dodecanoate are obtained. Doristeryl dodecanoate ($C_{39}H_{68}O_2$) requires 82.33% C; 12.04% H; 5.63% O. The elemental analysis for the compound prepared is 82.19% C; 12.01% H; 5.80% O.

EXAMPLE XVI

The procedure described in Example XIV is repeated with the exception that 1.29 grams of tridecanoic acid are used in place of the decanoic acid. 2.34 grams of chromatographically purified doristeryl tridecanoate are obtained. Doristeryl tridecanoate ($C_{40}H_{70}O_2$) requires 82.41% C; 12.01% H; 5.49% O. The elemental analysis for the compound prepared is 82.32% C; 12.05% H; 5.63% O.

EXAMPLE XVII

The procedure described in Example XIV is repeated with the exception that 1.37 grams of tetradecanoic acid are used in place of the decanoic acid. 2.33 grams of chromatographically pure doristeryl tetradecanoate are obtained. Doristeryl tetradecanoate ($C_{41}H_{72}O_2$) requires 82.48% C; 12.16% H; 5.36% O. The elemental analysis for the compound prepared is 82.33% C; 12.30% H; 5.37% O.

Although the invention has been described in detail with respect to specific preferred embodiments thereof, it should be understood that these are not intended to be exhaustive and the invention is not limited thereto but rather it will be appreciated by those skilled in the art that modifications and variations are possible which are within the spirit of the invention and the scope of the claims.

What is claimed is:

1. Liquid crystalline compounds having a cholesteric mesophase which are represented by the formula

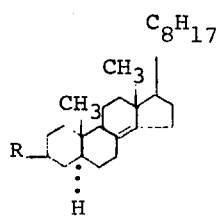

wherein R represents a member selected from the group consisting of halogens, aliphatic ester radicals having from three to fifteen carbon atoms and carbonate radicals having up to and including fifteen carbon atoms.

2. The compounds as defined in claim 1 wherein R represents a halogen.

3. The compounds as defined in claim 1 where R represents an aliphatic ester radical having from three to fifteen carbon atoms.

4. The compounds as defined in claim 1 wherein R represents a carbonate radical having up to and including nine carbon atoms.

* * * * *